United States Patent
Rabret et al.

(10) Patent No.: US 10,270,299 B2
(45) Date of Patent: Apr. 23, 2019

(54) STATOR COMPRISING A SPLIT CORE AND METHOD FOR PRODUCING SUCH A STATOR

(71) Applicant: SAGEM DEFENSE SECURITE, Boulogne Billancourt (FR)

(72) Inventors: Bernard Rabret, Boulogne Billancourt (FR); Jerome Piaton, Boulogne Billancourt (FR); Thierry Bessede, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 308 days.

(21) Appl. No.: 14/891,276

(22) PCT Filed: May 13, 2014

(86) PCT No.: PCT/EP2014/059792
§ 371 (c)(1),
(2) Date: Nov. 13, 2015

(87) PCT Pub. No.: WO2014/184206
PCT Pub. Date: Nov. 20, 2014

(65) Prior Publication Data
US 2016/0111921 A1    Apr. 21, 2016

(30) Foreign Application Priority Data
May 14, 2013   (FR) ..................................... 13 54326

(51) Int. Cl.
*H02K 1/14*       (2006.01)
*H02K 15/02*      (2006.01)
*H02K 29/03*      (2006.01)

(52) U.S. Cl.
CPC .......... *H02K 1/148* (2013.01); *H02K 15/022* (2013.01); *H02K 29/03* (2013.01)

(58) Field of Classification Search
CPC .............................. H02K 1/148; H02K 15/022
(Continued)

(56) References Cited

U.S. PATENT DOCUMENTS

| 6,121,711 A * | 9/2000 | Nakahara | H02K 1/14 |
| | | | 242/432.3 |
| 2004/0084989 A1* | 5/2004 | Schunk | H02K 1/148 |
| | | | 310/216.012 |

(Continued)

FOREIGN PATENT DOCUMENTS

| DE | 102 03 272 A1 | 7/2003 |
| DE | 10 2007 032 872 A1 | 1/2009 |

(Continued)

*Primary Examiner* — Naishadh N Desai
(74) *Attorney, Agent, or Firm* — Muncy, Geissler, Olds & Lowe, P.C.

(57) ABSTRACT

An electric motor stator wherein an annular central part and a yoke surrounding the central part, the central part includes a bundle of laminations delimiting poles, wherein the bundle of laminations includes a plurality of first laminations each containing portions forming a pole part that are joined by an annular internal portion, second laminations each forming a pole part being mounted between the first laminations, the first laminations being spaced apart from one another at a predetermined spacing according to a required inductance.

7 Claims, 3 Drawing Sheets

(58) Field of Classification Search
USPC .... 310/216.001, 216.004, 216.007–216.017,
310/216.024–216.35, 216.041,
310/216.045–216.048
See application file for complete search history.

(56) References Cited

U.S. PATENT DOCUMENTS

| | | | |
|---|---|---|---|
| 2007/0159014 A1* | 7/2007 | Chen | H02K 1/145 |
| | | | 310/67 R |
| 2008/0018197 A1* | 1/2008 | Yamamoto | H02K 1/148 |
| | | | 310/268 |
| 2008/0265694 A1 | 10/2008 | Chuang | |
| 2009/0108699 A1* | 4/2009 | Li | H02K 1/148 |
| | | | 310/216.009 |
| 2010/0054971 A1 | 3/2010 | Li et al. | |
| 2012/0200177 A1* | 8/2012 | Atkinson | H02K 1/145 |
| | | | 310/12.18 |

FOREIGN PATENT DOCUMENTS

| | | | | |
|---|---|---|---|---|
| EP | 1722458 A1 * | 11/2006 | | H02K 1/148 |
| WO | WO 2004/114500 A1 | 12/2004 | | |

* cited by examiner

STATOR COMPRISING A SPLIT CORE AND METHOD FOR PRODUCING SUCH A STATOR

BACKGROUND OF THE INVENTION

The present invention relates to a stator of an electric motor, the electric motor comprising such a stator and a method for producing such a motor. The invention relates for example to motors with magnets.

Such motors are for example used for moving flight surfaces in an aircraft with electric flight controls.

A motor generally comprises a rotor mounted so as to pivot in a stator formed by a bundle of laminations defining poles surrounded by electric circuits in coils in order to constitute electrical phases for driving the motor.

Some drive devices comprise a first motor and a second motor that are connected to the same movable element in order both to be able to drive this element independently of each other. The rotors of the two motors may for this purpose be connected to the same shaft.

In nominal operating mode, only the first motor is controlled so as to drive the element; the second motor is used only in the event of failure of the first motor.

An actuator having two or even three motors having a common output shaft has also been envisaged. Three stators are then mounted along the shaft, each opposite a portion of the shaft that is arranged to form a rotor. This solution is less heavy and less bulky while satisfying the same safety requirements as the previous solution.

This redundancy affords more safety in the functioning of the drive device to the detriment however of a relatively high mass of the drive device.

Furthermore, some breakdowns of the motor or of its control electronics may lead the motor to exert a braking force. The motors must therefore be sized so as to be able to compensate for this braking force generated by the faulty motor. In particular, when the faulty motor has a short-circuit between phases, the driving of the element by the other motor causes the rotation of the rotor of the faulty motor, inducing in the short-circuited phases a current that cannot be discharged and causes the appearance of a torque.

The motors must therefore be sized so as to be able to move the element alone, taking account not only of external actions exerted on the element but also the torque that would be generated by a faulty motor. The motors must therefore be able to produce a higher torque, which increases their cost, size and mass.

The maximum short-circuit torque $C_{CC}$ has the value $C_{CC}=3/2 \cdot K^2/(2\ p \cdot (L-M))$ and appears at the speed $V=R/(p \cdot (L-M))$ with a slope with the origin equal to $3/2 \cdot K^2/R$ where K is the phase/neutral torque coefficient, p is the number of pairs of poles, L is the inductance of the motor, M is the mutual phase/neutral inductance and R is the phase/neutral resistance.

To limit this torque, increasing the resistance of the coils in order to increase the rotation speed of the rotor at which the maximum torque appears is known. This solution can be envisaged only for motors working at low speed. This also increases the losses by Joule effect, degrading the performance of the motor and making cooling of the motor necessary.

Other solutions exist that require significant action on the magnetic circuit and assume modifications to the industrial processes for manufacturing the motors that are just as great. One of these solutions consists of reducing the flux of the magnets and compensating for this reduction in the flux by providing a more or less great protrusion of the laminations (reluctance motors).

BRIEF SUMMARY OF THE INVENTION

One aim of the invention is to provide a means for being able, when the motor is manufactured, to easily adapt the motor to a predetermined acceptable maximum short-circuit torque.

For this purpose, it has been decided to act on the inductance of the stator.

To this end, according to the invention, an electric motor stator is provided, comprising an annular central part and a yoke surrounding the central part, the central part comprising a bundle of laminations delimiting poles, the bundle of laminations comprising a plurality of first laminations each comprising portions forming a pole part that are joined by an annular internal portion, second laminations each forming a pole part being mounted between the first laminations, the first laminations being spaced apart from one another at a predetermined spacing according to a required inductance.

By controlling the inductance of the stator, the short-circuit torque of the motor is adjusted. The motor formed in accordance with the invention thus has a predefined short-circuit torque suited to the application envisaged, using a conventional manufacturing tool.

According to an advantageous feature of the invention, the stator comprises decoupling teeth extending between the adjacent poles.

The decoupling teeth make it possible to limit the magnetic couplings between the poles.

Another subject matter of the invention is an electric motor comprising such a stator.

The invention also relates to a method for manufacturing such a stator.

Other features and advantages of the invention will emerge from a reading of the following description of particular non-limitative embodiments of the invention.

BRIEF DESCRIPTION OF THE DRAWINGS

Reference will be made to the accompanying drawings, among which.

DETAILED DESCRIPTION OF THE INVENTION

Figure 1:
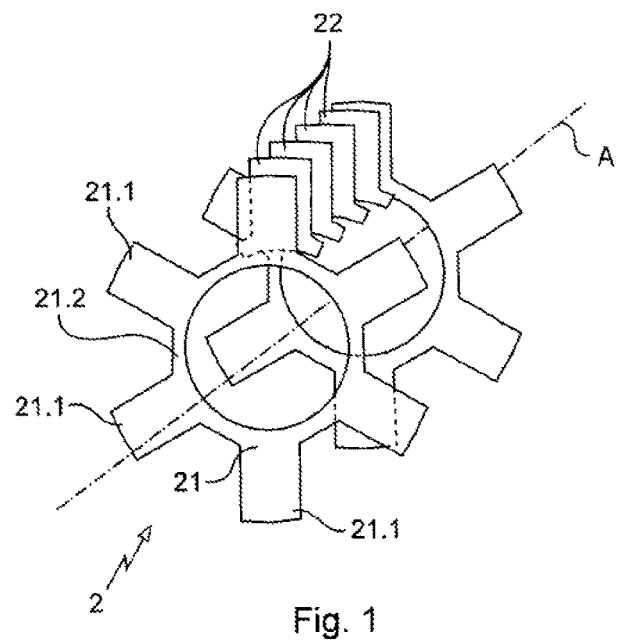
FIG. 1 is a partial schematic view, in cross-section and in exploded view, of the internal part of a stator according to a first embodiment of the invention.
Figure 2:
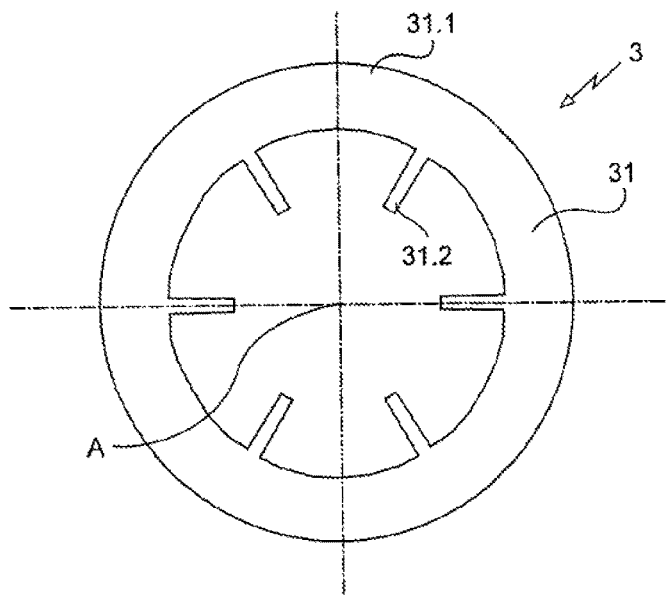
FIG. 2 is a schematic view in cross-section of the yoke of the stator in accordance with the first embodiment of the invention.
Figure 3:
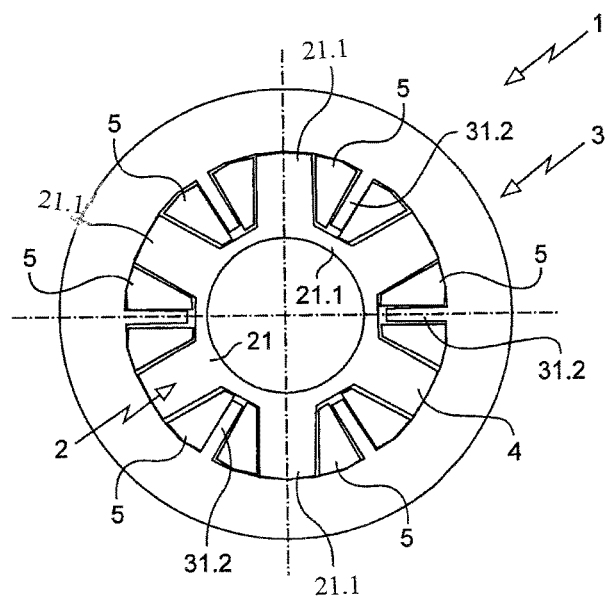
FIG. 3 is schematic view in cross-section of the stator according to the first embodiment of the invention, once it is assembled.

With reference to FIGS. 1 to 4, the electric motor comprises a stator 1 and a rotor mounted so as to pivot in the stator 1 about an axis A (normal of the plane of FIGS. 2 and 3). The rotor is known per se and, as the invention does not relate to it, it is not shown in the figures and will not be described in further detail hereinafter.

The stator 1 comprises a central part designated overall as 2, with an annular form defining a housing receiving the rotor pivotally, and a yoke 3 surrounding central part 2.

The central part 2 comprises a bundle of laminations delimiting poles 4 or teeth. The bundle of laminations comprises a plurality of first laminations 21 and second laminations 22. The laminations are stacked along the axis A.

Each first lamination 21 comprises portions 21.1 each forming a pole part and an annular internal portion 21.2 that joins the portions 21.1 to one another.

Each second lamination 22 forms a pole part and is mounted with other second laminations 22 behind a portion 21.1. Each second lamination is therefore mounted either between a second lamination 22 and a portion 21.1, or between two second laminations 22. The laminations are fixed to the laminations between which they are mounted preferably by clamping (a tongue cut in one of the laminations is engaged in a cutout in an adjacent lamination). In a variant, the laminations may be fixed by another method and for example by welding.

Thus the second laminations 22 are mounted between the first laminations 21 that will provide the holding in position and the securing of the laminations to one another. The number of second laminations 22 mounted between the first laminations 21 determines a spacing, or "pitch", between the first laminations 21. The pitch is determined according to a required inductance of the stator.

The motor comprises electrical circuits depicted schematically at 5, which are wound in a coil around each pole 4. The electrical circuits 5 serve for controlling the motor and are for this purpose connected to a control unit, not shown.

The yoke 3 is formed by a bundle of laminations 31 that are here identical to one another. The laminations are stacked around the axis A.

Each lamination 31 comprises a flat ring 31.1 and decoupling teeth 31.2 extending from an internal circumference of the ring 31, projecting towards the inside of the latter. The laminations 31 are fixed to one another as before. The decoupling teeth 31.2 extend between the adjacent poles 4.

The stator 1 here has a cross-section transverse to the axis A having an external contour of circular shape. It goes without saying that this external contour may have a different shape and for be for example a square shape.

Figure 5:
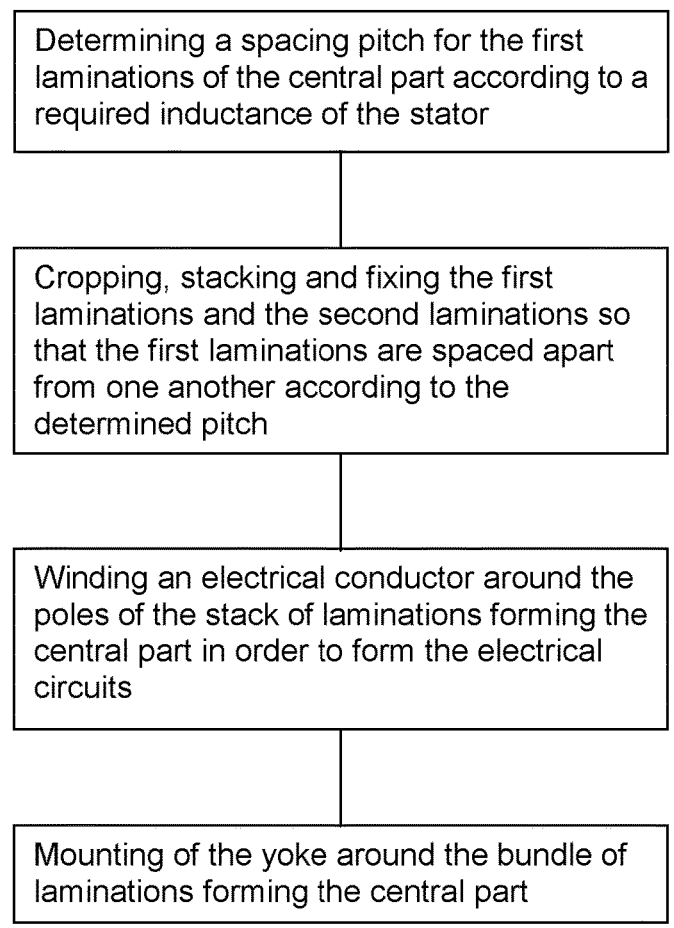
FIG. 5 is a flowchart illustrating a method for manufacturing a stator.

The stator 1 of the motor is produced by using the following manufacturing method as shown in FIG. 5.

This method comprises a phase of manufacturing the central part 2, comprising the steps of:
  determining a spacing pitch for the first laminations 21 of the central part 2 according to a required inductance of the stator,
  cropping, stacking and fixing the first laminations 21 and the second laminations 22 so that the first laminations 21 are spaced apart from one another according to the determined pitch,
  winding an electrical conductor around the poles 4 of the stack of laminations forming the central part 2 in order to form the electrical circuits 5.

It will be understood that the required inductance of the stator is determined according to a maximum allowable short-circuit torque. This depends on the envisaged application for the motor. The number of first laminations with respect to the total number of laminations is for example greater than 5%.

This method comprises a phase of manufacturing the yoke 3. This phase comprises the steps of cropping, stacking and fixing the laminations 31 to one another.

The method continues with the mounting of the yoke 3 around the bundle of laminations forming the central part 2 after the winding operation. The yoke 3 is fitted on the central part 2 so that each decoupling tooth extends halfway between two poles of the stack of laminations forming the central part 2.

The elements that are identical or similar to those described previously will bear a numerical reference identical to those in the following description of the second embodiment.

Figure 4:
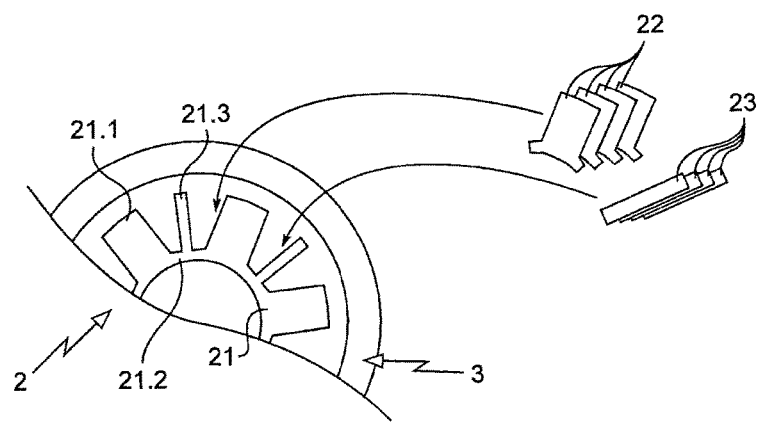
FIG. 4 is a partial view in exploded perspective of a stator according to a second embodiment.

In the second embodiment in FIG. 4, the stator comprises as before a central part 2 comprising a bundle of laminations delimiting poles 4.

The bundle of laminations comprises a plurality of first laminations 21 and second laminations 22.

Each first lamination 21 comprises here portions 21.1 each forming a pole part, an annular internal portion 21.2 that joins the portions 21.1 to one another and portions 21.3 forming a decoupling tooth that are connected to the annular internal portion 21.2. The portions 21.3 extending projecting towards the outside of the annular internal portions 21.2 so that there is a portion 21.3 halfway between the portions 21.1 on each pair of adjacent portions 21.1.

Each second lamination 22 forms a pole part and is mounted with other second laminations 22 behind a portion 21.1. Each second lamination 22 is therefore mounted either between a second lamination 22 and a portion 21.1, or between two second laminations 22. The laminations are fixed to the laminations between which they are mounted preferably by clamping (a tongue cut in one of the laminations is engaged in a cutout in an adjacent lamination). In a variant, the laminations may be fixed by another method and for example by welding.

The central part 2 comprises third laminations 23 each forming a decoupling tooth part, the third laminations 23 being stacked with the first laminations 21 and the second laminations 22.

Each third lamination 23 forms a pole part and is mounted with other second laminations 22 behind a portion 21.3. Each third lamination 23 is therefore mounted either between a third lamination 23 and a portion 21.3, or between two third laminations 22.

The laminations are fixed to the laminations between which they are mounted preferably by clamping (a tongue cut in one of the laminations is engaged in a cutout in an adjacent lamination). In a variant, the laminations may be fixed by another method and for example by welding.

The laminations 31 forming the yoke 3 are in the form of flat rings with annular internal and external contours.

Naturally the invention is not limited to the embodiments described but encompasses any variant falling within the field of the invention as defined by the claims.

In particular, the stator may have no decoupling teeth.

The decoupling teeth may be secured to the annular central part of the stator or of the stator yoke.

Although the use of decoupling teeth is particular advantageous with a central part comprising first laminations spaced apart from one another at a predetermined pitch according to the required inductance, the decoupling teeth can be used in stators, with a yoke, having a central part with a different structure.

The portions of laminations and laminations forming a pole part may have a constant width as shown in the figures or a variable width with for example a wider part close to the yoke or other.

The invention claimed is:

1. An electric motor stator comprising an annular central part and a yoke separate from and surrounding the central part, the central part comprising a bundle of laminations delimiting poles, wherein the bundle of laminations comprises a plurality of first laminations each comprising portions forming a pole part that are joined by an annular internal portion, second laminations each forming a pole part being mounted between the first laminations in an axial direction of the stator, the first laminations being axially spaced apart from one another at a predetermined spacing according to a required inductance.

2. An electric motor stator comprising an annular central part and a yoke separate from and surrounding the central part, the central part comprising a bundle of laminations delimiting poles, wherein the bundle of laminations comprises a plurality of first laminations each comprising portions forming a pole part that are joined by an annular internal portion, second laminations each forming a pole part being mounted between the first laminations in an axial direction of the stator, the first laminations being axially spaced apart from one another at a predetermined spacing according to a required inductance, said stator further comprising teeth extending along a radial direction of the stator and in the space between the adjacent pole parts, the teeth being separated from the annular inner portion by a gap.

3. The stator according to claim 2, in which the teeth are each formed by a portion of laminations of the yoke, said lamination portion extending so as to project radially outwards.

4. An electric motor stator comprising an annular central part and a yoke surrounding the central part, the central part comprising a bundle of laminations delimiting poles, wherein the bundle of laminations comprises a plurality of first laminations each comprising portions forming a pole part that are joined by an annular internal portion, second laminations each forming a pole part being mounted between the first laminations in an axial direction of the stator, the first laminations being axially spaced apart from one another at a predetermined spacing according to a required inductance, said stator further comprising teeth extending along a radial direction of the stator and in the space between the adjacent pole parts;

wherein the central part further comprises third laminations, and the teeth include first teeth connected to the annular internal portion, and second teeth faulted on the third laminations, the third laminations being stacked with the first laminations and the second laminations.

5. A motor comprising a stator according to claim 1.

6. A method for manufacturing a stator, comprising an annular central part comprising first laminations and second laminations, each first lamination comprising portions forming a pole part which are joined by an annular internal portion, the second laminations each forming a pole part and being mounted between the first laminations, the method comprising the steps of:

determining an axial spacing pitch of the first laminations according to a required inductance of the stator, producing the annular central part by stacking first laminations and the second laminations so that the first laminations are spaced apart from one another at the determined pitch by the second laminations, winding an electrical conductor around at least one of the poles of the bundle of laminations forming the central part; and mounting a yoke around the bundle of laminations after winding the electrical conductor around at least one of the poles of the bundle of laminations forming the central part.

7. The method according to claim 6, in which the yoke comprises teeth each formed by a lamination portion extending so as to project radially inwards, the yoke being mounted in such a way that each tooth extends halfway between two poles in the bundle of laminations forming the central part.

* * * * *